Patented July 10, 1945

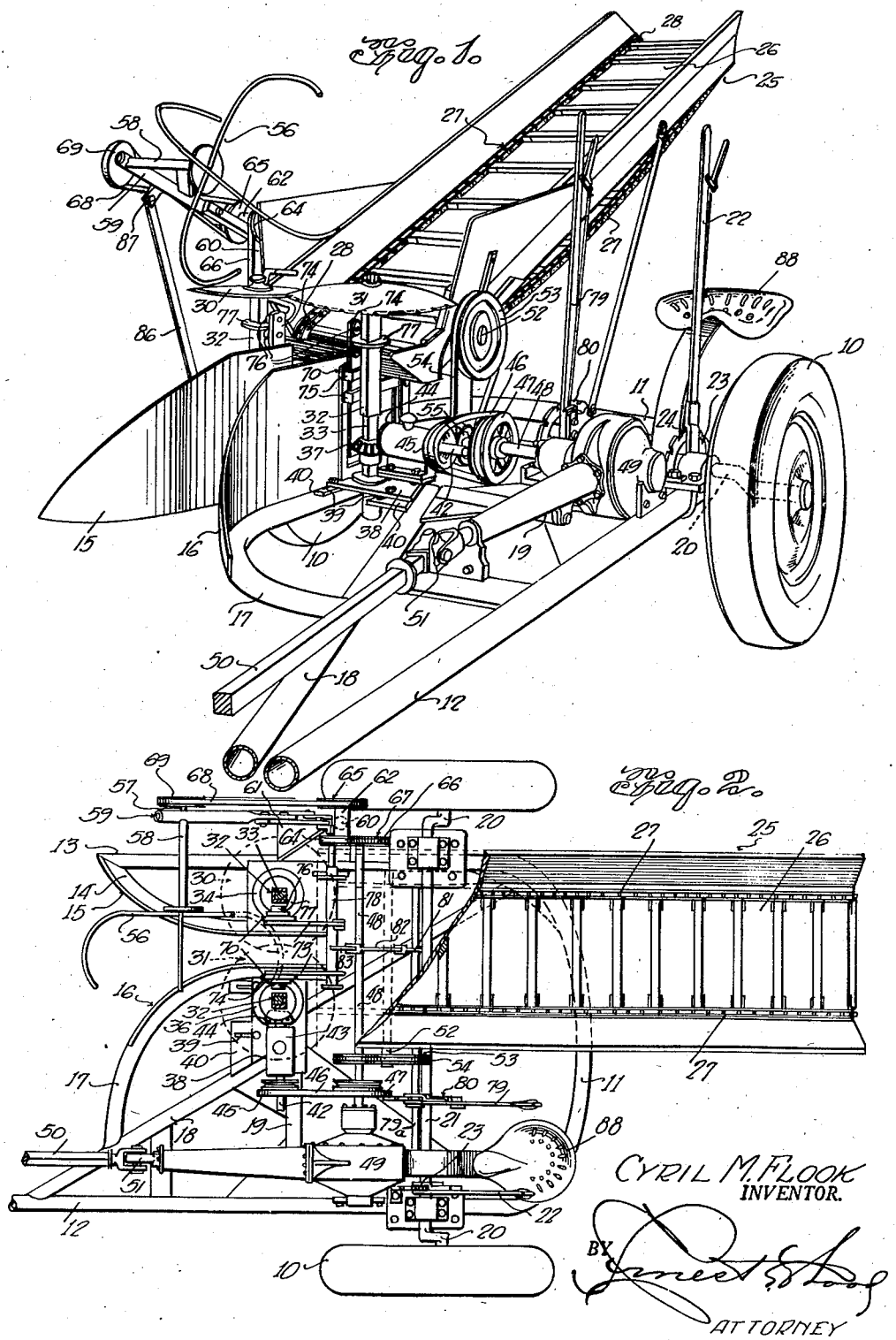

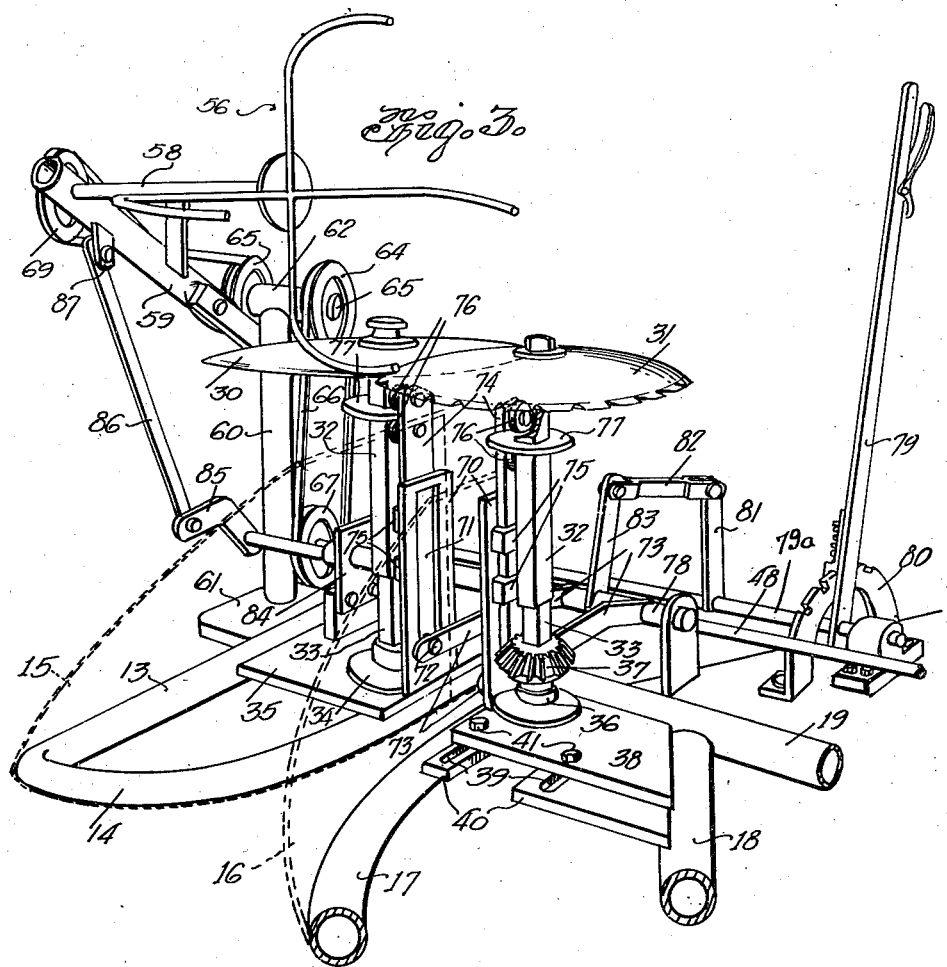

2,380,161

UNITED STATES PATENT OFFICE 2,380,161

ROW CROP HEADER

Cyril M. Flook, Garland, Tex., assignor of one-fourth to Earl Hogge, one-fourth to H. A. Shugart, and one-fourth to W. M. Herring, Garland, Tex.

Application October 18, 1943, Serial No. 506,677

5 Claims. (Cl. 56—15)

This invention relates to agricultural implements and it has particular reference to machines for topping or heading maize, kaffir corn and similar row crops.

The principal object of the invention is to provide a simplified implement for economically harvesting row crop heads, including a wheeled frame so constructed and arranged that it may be drawn, as by a tractor, along the rows and provided with cooperating discs for severing the heads from the stalks, associated with which is a reel for directing the stalks into the cutting range of the discs, the reel and one of the discs being operated from the power take-off of the tractor while both the reel and the discs are capable of vertical adjustment to correspond to varying heights of the stalks.

Another and equally important object of the invention is to provide a novel form of means to effect simultaneous raising and lowering of the cutting disc assembly and the reel, said means consisting of vertically reciprocable plates having roller engagement with telescoping shafts, the latter, in turn carrying the discs, the said plates and the reel being actuated from an oscillatable shaft through a series of inter-connected links.

Another object of the invention is to provide for the raising and lowering of the machine frame through the medium of lever actuated, offset axles, such height adjustment of the frame being effective to lower the cutting discs for the harvesting of heads from short stalks.

With the foregoing objects as paramount, the invention consists further of certain features of accomplishment, to become manifest as the description proceeds, taken in connection with the accompanying drawings, wherein:

Figure 1 is a perspective view of a row crop header constructed according to the present invention.

Figure 2 is a plan view with the discs shown in dotted lines and a portion of the elevator broken away, and Figure 3 is a view in perspective of only that part of the machine for operating and vertically manipulating the cutting discs and reel.

Continuing with a more detailed description of the drawings, reference is primarily made to Figure 1 wherein numeral 10 denotes the two wheels upon which the frame is supported, the latter consisting of a substantially U-shaped member 11, one leg 12 of which is longer than the companion leg 13 and serves as a tongue, by which the implement is connected to and drawn by the draw bar of a tractor.

To the end of the leg 13 is connected a curved member 14 of similar cross-sectional shape, which serves as a mounting for a guide plate 15, confronting which is a companion and similarly shaped guide plate 16, mounted upon a curved member 17, the latter extending between an oblique brace 18 and a transverse brace 19 extending from one to the other of the legs 12 and 13 of the frame 11. It may be mentioned at this point that while the several members comprising the machine frame are shown as being constructed from tubular stock, it is to be understood that angle iron, channel iron or like material can be employed with equal results. Moreover, the disposition of the various braces and reinforcing elements in the frame construction is a matter of choice.

The wheels 10 are each mounted upon offset ends 20 of the axle 21 which may be a continuous member extending the full width of the frame 11 or in short sections, each bearing the offset 20, in which latter case, two levers will be required to effect adjustment thereof. However, since the drawings show a continuous axle, but one lever 22 is provided and is secured in adjusted positions in the usual manner, i. e., by a quadrant 23 and detent 24.

Mounted above and at one side of the frame is an elevator or conveyor 25. This conveyor, as will become apparent presently receives the severed heads and transports them rearwardly of the machine for discharge into a suitable trailer conveyance (not shown) drawn by the machine. The conveyor consists of the stationary bed 26, on each side of which, operates an endless chain 27, the latter running over sprockets 28 at each end of the elevator. Transverse cleats 29 are secured at their ends to the chains 27 and are equi-distantly spaced apart and serve to move the material along the bed 26 from the cutting discs to the trailer.

The cutting disc 30 is idle while its companion 31 is driven. Both discs are mounted on hollow square shafts 33. In the case of the shaft 33 of the idle cutting disc 30, this shaft is mounted for free rotation in a boss 34 which latter is fixed to a supporting plate 35 (Figure 3). The shaft 33 of the companion disc 31 is likewise supported in a boss 36 for free rotation but is required to be driven by means of a beveled gear 37 mounted thereon. Moreover, the boss 36 is affixed to a plate 38 which is capable of limited sliding adjustment, by virtue of slots 39 in supporting members 40, and bolts 41 which extend through the plate 38, slots 39 and members 40. This adjustment of the mounting of the cutting disc 31 is for the purpose of varying the tension on the belt which serves to drive the disc 31.

The driving means for the disc 31 consists of a shaft 42, journaled in a bearing 43, carrying a beveled gear 44 which meshes with the gear 37 on the square shaft 33. A V-type pulley 45 is mounted on the opposite end of the shaft 42 and is driven by a belt 46, surrounding a pulley 47, mounted on the main drive shaft 48, which latter extends from one side of the machine frame to the other.

The main drive shaft 48 is driven through gears contained in housing 49, by a shaft 50, the latter, in turn, being driven from the conventional power take-off of a tractor. Universal joints 51 are provided at the ends of shaft 50 to insure the required flexibility in the coupling.

It will be observed in Figure 2 that a part of the elevator 25 has been broken away to avoid obscuring certain parts of the machine. However, a part of the shaft 52 which carries the elevator chain sprockets is shown and upon one end of this shaft is mounted a pulley 53. A belt 54 surrounds this and another pulley 55, mounted on the main drive shaft 48, as shown in Figure 1.

It is apparent from the foregoing that as the shaft 50 is rotated by the tractor power take-off, shaft 48 is caused to revolve through the gear assembly in housing 49. Shaft 42 is caused to rotate through pulleys 45, 47, and connecting belt 46. Thus, the square shafts 33 and 32 are caused to rotate to operate cutting disc 31. At the same time, the elevator is operated through pulleys 53, 55 and belt 54.

In order to insure proper tension on the belt 46, the provision earlier described, for adjusting the position of the mounting of the disc 31 and its associated elements is made. By loosening bolts 41, the mounting plate 38 may be moved forwardly or rearwardly, as conditions may require, to respectively increase or decrease the tension on belt 46.

Disposed above the discs 30 and 31 is a reel 56 which consists of a series of curved arms which successively engage and constrain the stalks, as they are approached, to move into the operative range of the discs.

The reel is mounted on a shaft 57 (Figure 2) which operates in a tubular housing 58, the latter being secured, as by welding, to a supporting arm 59. This arm 59 is pivotally supported at one end upon an upright 60, the latter being mounted upon a ledge 61 at one side of the machine frame, as shown in Figures 2 and 3. At the top of the upright 60 there is mounted an elongated bearing 62 which contains a short shaft 63, carrying on one end a pulley 64 and upon its opposite end a pulley 65. A belt 66 embraces this pulley 67 on the main drive shaft 48.

A belt 68 surrounds pulley 65, which latter is driven through the belt connection just mentioned, and a pulley 69, mounted upon an end of the reel shaft 57. Thus, it is through these connections that the reel is operated from the main drive shaft 48.

Referring now particularly to the mechanism by which the cutting discs are raised and lowered, with simultaneous raising and lowering of the reel 56, attention is directed especially to Figure 3 wherein this mechanism is more concisely illustrated. Mounted upon plates 35 and 38 adjacent the disc mounting shafts 32 are perpendicular plates or guides 70. These guides, as they may be called, are provided with longitudinal slots or openings 71 to permit vertical movement of pins 72 which form pivotal connection between actuating arms 73 and bars 74, the latter being held against other than perpendicular movement relative to the mounting plates 35—38 by straps 75, connected to the guides 70 in vertically spaced relationship and embracing the bars 74. As the arms 73 are actuated, the bars 74 move vertically.

Mounted one above the other at the tops of the bars 74 are rollers 76. These rollers engage the upper and lower surfaces of circular flanges 77, carried upon the upper portions 32 of the squared shafts supporting the discs and are interposed between the rollers of each pair. Obviously then, when the arms 73 are actuated in the manner to be presently explained the bars 74 are raised or lowered, to similarly actuate the sections 32 of the square shafts, thereby changing the vertical positions of the discs.

The arms 73 are actuated by reason of their rigid connection to a shaft 78, rearwardly of and transverse to the disc shafts. This shaft 78 is oscillated by a hand lever 79, operating over a quadrant 80 and has an arm 81 affixed thereto which is connected, by means of a link 82 to another arm 83 affixed to the shaft 78. The lever 79 is rigidly mounted on a shaft 79a rearwardly of and parallel with shaft 78 and it is to this shaft 79a also that arm 81 is affixed.

It will be observed, especially in Figure 3, that the shaft 78 is extended beyond leg 13 of the machine frame and is supported by a bracket 84. To the extended end of the shaft is affixed a bell crank 85 which has its opposite arm pivotally connected to an arm 86, the latter extending upwardly and pivotally connected, by means of an ear 87 to the underside of the supporting arm 59 of the reel 56.

From the foregoing it will be determined that upon oscillatory movement of the shaft 78 to actuate the discs vertically, the reel 56 will be simultaneously adjusted in height in corresponding relationship.

An operator, from his position on the seat 88 has ready access to both levers 22 and 79 and as the machine slowly travels along the rows of stalks, he is enabled with minimum effort, to control the cutting height of the discs 30 and 31 to correspond to the heights of the stalks, thereby severing the same just below the heads with a high degree of accuracy, the heads falling onto the conveyor 26 for transportation to the trailer or other conveyance behind the machine.

Manifestly, the construction as shown and described is capable of some modification and such modification as may be construed to fall within the scope and meaning of the appended claims is also considered to be within the spirit and intent of the invention.

What is claimed is:

1. A machine for harvesting head crops comprising a wheeled frame capable of height adjustment, a pair of cooperating cutting discs mounted upon telescopically related shaft sections rising from said frame, means for rotating one of said shafts to impart rotation to the disc mounted thereon, a circular flange carried by each of the movable sections of said shafts, a vertically movable bar adjacent each of said sectional shafts, a second shaft having link connection with each of said bars and oscillatable to actuate said bars, rollers mounted in spaced relation on said bars and engageable with each face of said circular flanges to effect vertical adjustment of said discs, a reel operable over said discs and means connecting said second shaft and the mounting of said reel to effect vertical adjustment thereof simultaneously with that of said discs.

2. In a row crop heading machine, a wheeled frame, a pair of shafts composed of telescopically related sections rising from said frame, means for rotating at least one of said shafts, cooperating cutting discs mounted on the movable sections of said shafts, vertically movable bars parallel with said shafts, a second shaft having connection with said bars to actuate the same when said second shaft is oscillated, means connecting said bars with the movable sections of said first shafts to effect vertical movement thereof and the discs carried by said shaft sections, a reel rotatably disposed over said discs and means connecting said second shaft and reel mounting to effect simultaneous vertical movement thereof with said discs.

3. In a machine for severing heads from stalks, a wheeled frame, a pair of square shafts in telescopically related sections, the upper section of each being axially movable, a disc on each movable section and in overlapping relation with the companion disc, an oscillatable shaft, means connected with said movable shaft sections and actuated by said oscillatable shaft to effect vertical displacement of said movable sections and said discs, a reel rotatably disposed over the overlapped portions of said discs, means for operating said reel and means for effecting vertical displacement of said reel simultaneously with the displacement of said discs.

4. In a row crop header, a wheeled frame, a pair of cooperating cutting discs mounted upon vertically adjustable shafts supported on said frame, vertically movable bars adjacent said shafts, vertically spaced rollers on the upper ends of said bars, a circular flange on each of said vertically adjustable shafts whose edges are interposed between said rollers, an oscillatable shaft, means connecting said latter shaft with said bars to effect vertical movement thereof and said discs when said latter shaft is oscillated, a reel operatively disposed above said discs, means for driving said reel and means connecting said oscillatable shaft and reel mounting to effect vertical adjustment thereof in accordance with adjustments in the heights of said discs.

5. A machine as set forth in claim 3 in which the means for effecting vertical displacement of the discs consist of a bar adjacent to and parallel with each disc supporting shaft, slotted guide plates to which said bars are slidably connected to secure them against other than vertical movement, vertically spaced rollers mounted on said bars, circular flanges carried by the vertically movable sections of the disc supporting shafts, adapted to operate between said rollers and against which said rollers bear when said bars are vertically actuated, an oscillatable shaft, a laterally extending arm affixed to said oscillatable shaft and pivotally connected through the slots of said guide plates to said bars to actuate the same when said shaft is oscillated.

CYRIL M. FLOOK.